US011429097B2

(12) United States Patent
Rusignola et al.

(10) Patent No.: US 11,429,097 B2
(45) Date of Patent: Aug. 30, 2022

(54) PROGRAMMATIC APPLICATION OF ROUTER FLAGS FOR VEHICLE LIMITATIONS

(71) Applicant: GM CRUISE HOLDINGS LLC, San Francisco, CA (US)

(72) Inventors: Michael Rusignola, Burlingame, CA (US); Brian Donohue, San Francisco, CA (US); Lucio Rech, San Francisco, CA (US); Stephen Worlow, San Francisco, CA (US); Daniel Blick, San Francisco, CA (US); Varun Bharadwaj, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 153 days.

(21) Appl. No.: 16/557,635

(22) Filed: Aug. 30, 2019

(65) Prior Publication Data

US 2020/0409355 A1 Dec. 31, 2020

Related U.S. Application Data

(63) Continuation of application No. 16/457,696, filed on Jun. 28, 2019.

(51) Int. Cl.
*G05D 1/00* (2006.01)
*G07C 5/08* (2006.01)
*G07C 5/00* (2006.01)
*G06N 5/02* (2006.01)

(52) U.S. Cl.
CPC .......... *G05D 1/0027* (2013.01); *G05D 1/0088* (2013.01); *G06N 5/025* (2013.01); *G07C 5/008* (2013.01); *G07C 5/0816* (2013.01); *G05D 2201/0213* (2013.01)

(58) Field of Classification Search
CPC .............. G05D 1/0027; G05D 1/0088; G05D 2201/0213; G07C 5/0816; G07C 5/008; G06N 5/025; G01C 21/3807; G01C 21/3883; G01C 21/3461; G01C 21/3453; G01C 21/34; G08G 1/00
See application file for complete search history.

(56) References Cited

U.S. PATENT DOCUMENTS

| | | | |
|---|---|---|---|
| 2017/0192437 A1* | 7/2017 | Bier | G05D 1/0077 |
| 2017/0356751 A1* | 12/2017 | Iagnemma | G05D 1/0214 |
| 2020/0116497 A1* | 4/2020 | Jiang | G01C 21/32 |

* cited by examiner

*Primary Examiner* — Aaron L Troost
(74) *Attorney, Agent, or Firm* — Polsinelli, PC

(57) ABSTRACT

Systems and methods provide for routing autonomous vehicles by simulating an autonomous vehicle traversing a route on a map representing a physical area. A router flag can be generated at a specific location on the map. A router flag rule that defines a factor that caused a failure of the autonomous vehicle can then be created at the location, and the autonomous vehicle can be simulated traversing the to identify at least one other area on the map where the autonomous vehicle is likely to fail. An identifier can be applied to the other area on the map where the autonomous vehicle is likely to fail according to the router flag rule. The other area with the applied identifier can be omitted from a routable graph applied to the routing map, such that the route for the autonomous vehicle is generated in accordance with the routable graph.

17 Claims, 5 Drawing Sheets

PROGRAMMATIC APPLICATION OF ROUTER FLAGS FOR VEHICLE LIMITATIONS

CROSS-REFERENCE TO RELATED APPLICATIONS

The present application is a continuation and claims the priority benefit of U.S. application Ser. No. 16/457,696, filed Jun. 28, 2019, the disclosure of which is incorporated herein by reference.

TECHNICAL FIELD

The subject matter of this disclosure pertains to updating a portion of a map database using data captured by an autonomous vehicle, and more specifically pertains to updating routing based on the map database using diagnostics data obtained from an autonomous vehicle.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, where a processor executes instructions based upon the sensor signals to control a mechanical system of the autonomous vehicle, such as a vehicle propulsion system, a braking system, or a steering system.

The autonomous vehicle navigates using a combination of data captured by at least one sensor of the autonomous vehicle and an authoritative, routing map stored on the autonomous vehicle. The routing map is commonly created using a special purpose mapping vehicle which captures data at a much higher resolution than the sensors on the autonomous vehicle. Subsequently, when a specific autonomous vehicle is routed to a destination, the routing system relies on routable graphs that are derived from the routing map. The routing map serves as the primary input to the routable graph, which contains (among other things) the lanes that exist in the real world. The lanes are added to the routable graph, and the routable graph constructs routes for the autonomous vehicle from these lanes. Since the routable graph tells the autonomous vehicle where it is able to go and how to get there, any lanes not within the routable graph are effectively ignored when a route to a destination is considered.

In order for the routing map to be a useful input to this process, it needs to accurately reflect the state of the world in which the autonomous vehicle is driving. However, the world is changing all the time—new traffic signals are added, construction changes alter existing lanes and lane boundaries, signs appear and disappear, etc. These issues are conventionally addressed through blacklists, which prevent the lane in question from appearing in the routable graph until the underlying map issue can be corrected.

Not all problematic lanes, however, are caused by routing map inaccuracy. Some lanes cannot be driven by the autonomous vehicle due to autonomous vehicle limitations, like lanes that are too narrow, turns that are too sharp or hills that are too steep. Historically, these were removed from the routable graph via blacklists as well. However there are a number of issues related to blacklists, such as the process for doing so was completely reactive (i.e. the autonomous vehicle needed to fail first), there was not a good mechanism for reviewing/removing blacklists for autonomous vehicle limitations when the autonomous vehicle's capabilities improved, and blacklists apply across all types of autonomous vehicles (e.g., cannot be customized to different autonomous vehicles). Methods and systems are needed to address the above limitations of blacklists.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for ensuring that autonomous vehicles can proactively and consistently avoid areas it cannot safely drive. For example, if the autonomous vehicle cannot handle steep hills above a specific gradient, and the fleet of autonomous vehicles are expanding into a new market (e.g., a new city), the disclosed systems and methods can ensure that the autonomous vehicles within the fleet do not attempt to drive up or down hills above the gradient (and to do so without having the autonomous vehicle encounter the problem first). In some embodiments, this can be customized and then applied to specific types of autonomous vehicles (e.g., class of vehicle, model and year it was manufactured, upgrades it may have received, etc.).

The following systems and methods provide for routing autonomous vehicles based on an assessment of its limitations. The autonomous vehicle can avoid problematic routes by determining an issue associated with self-driving a route for the autonomous vehicle based on a feature of the route. Based on the issue, an identifier (such as a router flag) can be applied to a portion of the route associated with the feature on a routing map. The portion of the route can then be omitted and/or removed from a routable graph applied to the routing map, such that the route for the autonomous vehicle is generated in accordance with the routable graph. In this way, problematic lanes can be omitted or removed from the routable graph prior to navigating the real world.

Figure 1:
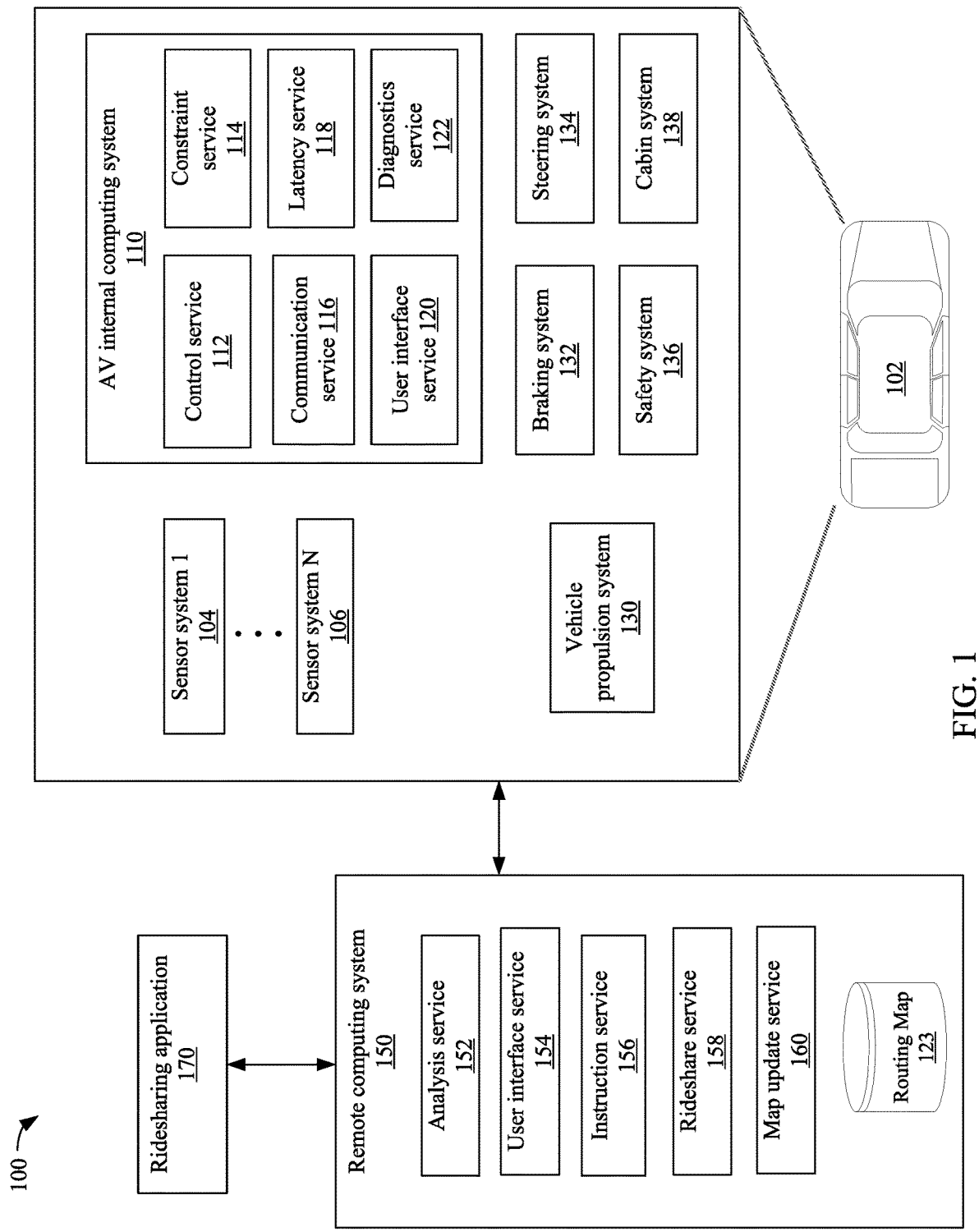
FIG. 1 illustrates an example schematic diagram of an autonomous vehicle and network environment, in accordance with some embodiments.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) AV internal computing system 110 that is in communication with the sensor systems 104-106 and the systems 130, 132, 134, 136, and 138. The AV internal computing system 110 includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The diagnostics service 122 in the AV internal computing system 110 can analyze data collected by sensors 104-106 to determine any issues or failures experienced by the autonomous vehicle 102 during navigation to a destination. If an issue or failure is identified, the diagnostics service 122 can flag the road portions (e.g., generate a router flag) where the issue was experienced to identify potential restricted areas for the autonomous vehicle 102. The diagnostics service 122 can communicate with map update service 160 via the communication service 116 to receive updated portions of the routing map 123. The map update service 160 can create, update, and/or modify routing map 123, which is the basis for generating routes for the autonomous vehicle 102 to navigate, in accordance with the data analyzed by diagnostics service 122.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

Figure 2:
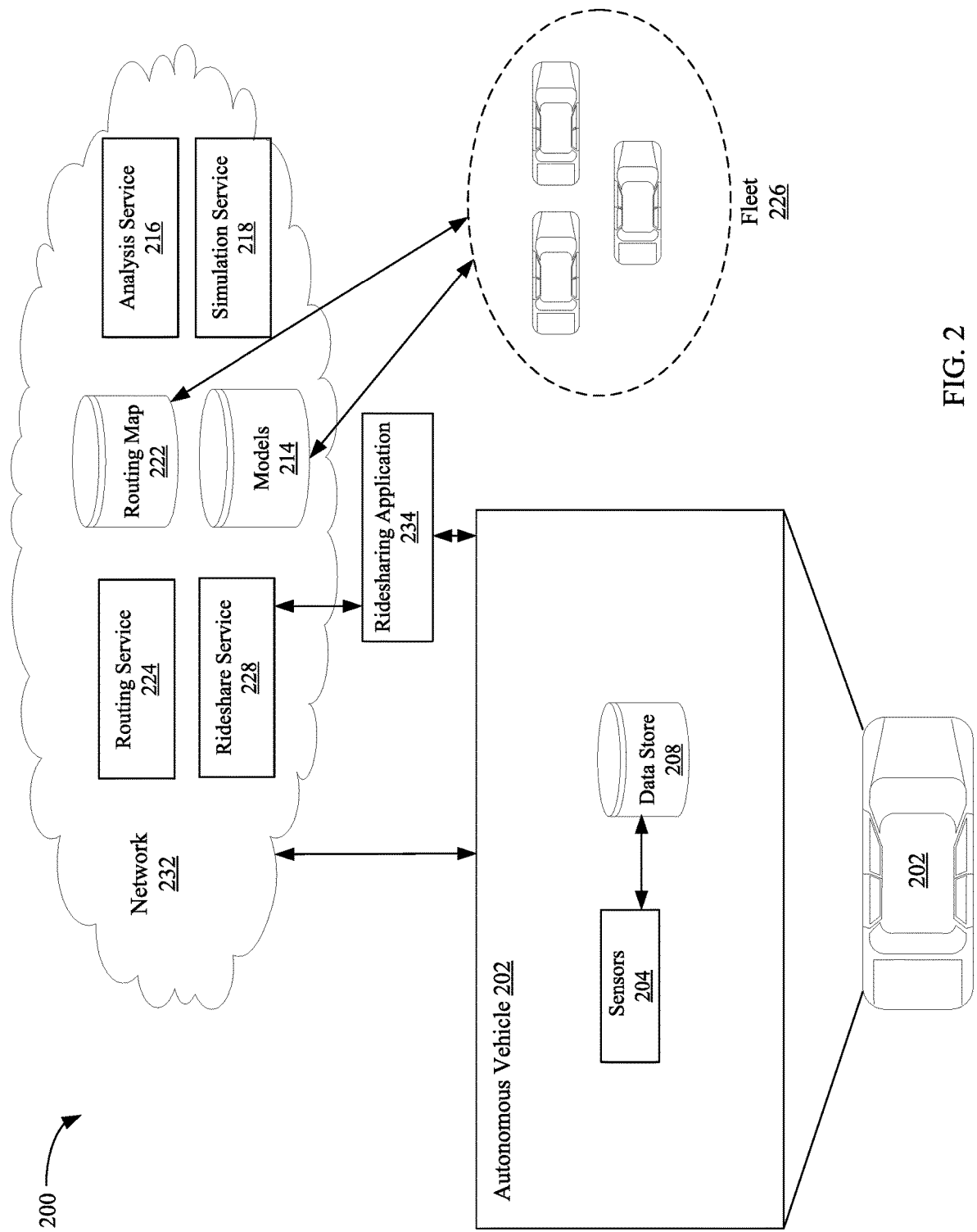
FIG. 2 illustrates an example schematic diagram of an autonomous vehicle and network environment that enables routing of an autonomous vehicle, in accordance with some embodiments.

FIG. 2 illustrates an example schematic diagram of an autonomous vehicle and network environment that enables routing of an autonomous vehicle in greater detail, in accordance with some embodiments. System 200 can maintain a fleet of vehicles that are fully autonomous without human intervention and/or monitoring. System 200 leverages identifiers, such as router flags, to dynamically and/or automatically omit or remove problematic lanes. For example, simulation and/or logical statements can identify problematic lanes (and in some embodiments predict problematic lanes), which can be omitted or removed from route consideration. These router flags can be recomputed with each routing map release.

In some embodiments, router flags can be based on one or more features that cause an issue with an autonomous vehicle 202 self-driving a route. The feature can indicate a limitation of the capabilities of autonomous vehicle 202, and the feature can be described as one or more logical conditions that can dynamically and/or automatically be applied to potential routes in order to identify certain routes that can cause the issue during autonomous vehicle operation. Autonomous vehicle 202 can be part of fleet 226, which includes multiple autonomous vehicles in communication with network 232. This allows data aggregation and accurate model generation across the entire fleet 226, so that the router flags can be applied to routes causing issues for at least one autonomous vehicle in the fleet 226 (and can be avoided for subsequent route planning in the fleet 226), and/or can be applied predictively to routes that have not been driven by the autonomous vehicles yet (such as in a new area that the fleet 226 has expanded into).

The system can determine that there is an issue associated with self-driving a route. For example, as the autonomous vehicle 202 navigates a route, sensors 204 can capture data reflecting the environment around the autonomous vehicle 202. The data store 208 can accumulate data from the sensors 204 as the autonomous vehicle 202 passes through a geographic area. Even over a small distance, data store 208 can accumulate data from the same sensor as the sensor continuously collects data, and then the system can determine that an issue has occurred while autonomous vehicle 202 was navigating/self-driving a route. For example, in the case of LIDAR, the LIDAR can continuously create a point map from data collected from the environment around the autonomous vehicle 202, while simultaneously monitoring whether the autonomous vehicle 202 has encountered an issue with navigating the route.

Based on the determination of the specific issue, the analysis of the data can be sent to a backend, remote network, such as network 232, which can route autonomous vehicle 202 via routing service 224 in accordance with the determination. For example, analysis service 216 can be notified that autonomous vehicle 202 has experienced an issue by generating a provisional flag that identifies that portion of the route for further testing (e.g., there needs to be analysis done here). The provisional flag can trigger the analysis that determines whether the failure at that location was due to an autonomous vehicle limitation that needs to be addressed. For example, analysis service 216 can determine that the issue associated with the provisional flag can be based on a feature of the route that causes the issue due to an autonomous vehicle limitation. For example, analysis service 216 can detect features represented in the captured data from sensors 204, and can compare the location of the detected features in the captured data with locations represented in the authoritative data, e.g. the routing map 222 used by routing service 224 to generate routes for the fleet 226. The features can provide the basis for models 214 that describe when autonomous vehicle 202 has experienced issues while navigating a route, such as features of a route that are predictors of autonomous vehicle 202 failure. Features can be, but are not limited to, one or a combination of, for example, incline, sharpness of turns (e.g., turning radius), or other similarly thematic issues related to the autonomous vehicle.

In some embodiments, the analysis service 216 can create router flag rules to identify the portions of the map which have the features associated with the one or more autonomous vehicle limitations. The router flag rules can be associated with features that can be determined to be a logical combination of one or more circumstances that are present during the issue. For example, autonomous vehicle 202 may fail to sustain acceptable velocity (e.g., may stop or nearly stop) while navigating up an incline and taking a turn during a portion of its route. One or more features can be extracted based on the logical combination, such as the autonomous vehicle 202 fails for inclines above 30 degrees or 58% grade (e.g., feature 1) and turns shaper than a turning radius of 34 feet (e.g., feature 2). In some embodiments, the logical combination of one or more features is identified by manual monitoring of data that has been provisionally flagged as occurring during an issue and/or failure during navigation. Anyone monitoring the data can, for example, input the logical combination of features responsible for the issue. In some embodiments, the logical combination of one or more features can be extracted through machine learning done. Any number or combination of features can be identified, from a single feature to multiple features that, taken together, cause the failure.

In some embodiments, once the logical combination of one or more features has been identified, the logical combination can be converted to a router flag rule. The router flag rule may be applied to the routing map 222, for example to the portion of the map associated with the provisional flag or to any number of other routes that include the one or more features, to identify portions of the map that will cause issues due to autonomous vehicle limitations. Based on the application of the router flag rule and identification of the portions of the map, the routing map 222 can be updated by applying the router flag to routes that include the one or more features. This will reduce redundancies in processing as well as prevent autonomous vehicle 202 and other autonomous vehicles within fleet 226 from experiencing the same issues or failures.

In some embodiments, simulation service 218 can create one or more simulations that can run in parallel to identifying the logical combinations. The simulations can test for autonomous vehicle failure based on certain features. For example, in a first instance, it can be determined that the autonomous vehicle has issues with areas meeting certain constraints, such as areas with light rails, not controlled by a light, and outside the area of the lidar maps. In a second instance, simulations can be created that test for autonomous vehicle limitations that include non-discrete (i.e. continuous) parameters, such as turn sharpness (e.g., the simulation runs the autonomous vehicle from lane A to lane B that involves a left turn, the left turn having a variable turn radius) which may be applied to any part of the map that is applicable. In both instances, router flags can be placed in the map that is associated with particular autonomous vehicle limitations. In some embodiments, the analysis service 216 determines whether to use a logical combination or a simulation to identify the router flag. If the autonomous vehicle limitation is dependent upon a relationship of one or more map conditions (e.g., such as, for example, certain areas with light rails not controlled by a light and outside the area of the lidar maps), the analysis service 216 may proceed to determining one or more logical combinations. If the autonomous vehicle limitation is based on performance, or based on a numerical property (e.g., generalizable autonomous vehicle limitations like narrow lanes, sharp turns, etc.), the analysis service 216 may proceed to creating rules for a simulation. In this way, both the one or more logical combinations and the rules for the simulation may act as router flag rules that can be applied to the map to place router flags. In some embodiments, to update where router flags are placed on the map based on autonomous vehicle upgrades, maintenance, etc., the router flag rules can be rerun each time the map is created based on the current autonomous vehicle model.

In some embodiments, models 214 can be continuously supplemented and updated by diagnostics data collected by the entire fleet 226. The diagnostics data can be transmitted to network 232 that can remotely compile and average the received diagnostics data from all vehicles of a same type within fleet 226 to generate models 214 remotely. For example, analysis service 216 can analyze the diagnostics data from similar autonomous vehicles within fleet 226 to generate detailed, accurate models 214 that can then be applied to models 214 on autonomous vehicle 202 on its next update or connection to network 232. As a result, models 214 can be continuously trained as each autonomous vehicle 202 within fleet 226 operates over time. In some embodiments, models 214 on network 232 can be supplemented by passenger input through rideshare service 228 in communication with ridesharing application 234.

Identifying an inability of one or more autonomous vehicles within fleet 226 to operate along a route based on the analysis of the diagnostic data from the entire fleet 226 can enable the detection of subtle or emerging operational issues with the autonomous vehicle 202 that are systemic issues. For example, for each sensor 204 that may be recording an issue, the diagnostic data from that sensor 204 can be compared against unsuccessful trips of other similar autonomous vehicles with that sensor and determine if there are features common to the route(s) that indicate limitations of the autonomous vehicle 202. This can enable models 214 to constantly learn and improve route feature identification. Based on identifying the inability of the autonomous vehicle 202 (and a threshold number of other similar autonomous vehicles within fleet 226), analysis service 216 can determine that the feature associated with the issue is a systemic issue to the one or more autonomous vehicles within the fleet 226. This feature can be included within models 214.

Analysis service 216 can publish the location and type of feature associated with the issue as a provisional flag. In some embodiments, based on determining the issue, once the feature has been confirmed as a thematic issue for the autonomous vehicle 202 due to one or more autonomous vehicle limitations, the analysis service 216 can generate a router flag rule based on the feature. The portion of the route can be, for example, one or more lanes, a maneuver from one lane to another, an intersection and the roads around the intersection, a specified geographic area encompassing the current location of the autonomous vehicle, etc. Each time the analysis service 216 creates a new version of a map, the analysis service may apply one or more router flag rules to the map to identify portions of the map that the autonomous vehicle will encounter issues due to limitations, and associate a router flag with the identified portions. Routing service 224, when generating a route to a destination for autonomous vehicle 202, can then omit or remove the portion of the route with the router flag from a routable graph that creates the route. Since routes are generated in accordance with the routable graph, the route for the autonomous vehicle 202 will exclude the portion of the route with the router flag, thus ensuring that the autonomous vehicle 202 does not navigate routes that will be beyond the capabilities of the autonomous vehicle 202.

In some embodiments, the same issue can apply across multiple autonomous vehicles of the same type within the fleet 226. The portion of the route with the router flag can, then, be omitted or removed from the routable graph for each autonomous vehicle within the fleet 226 that is of the same type of vehicle.

Figure 3:
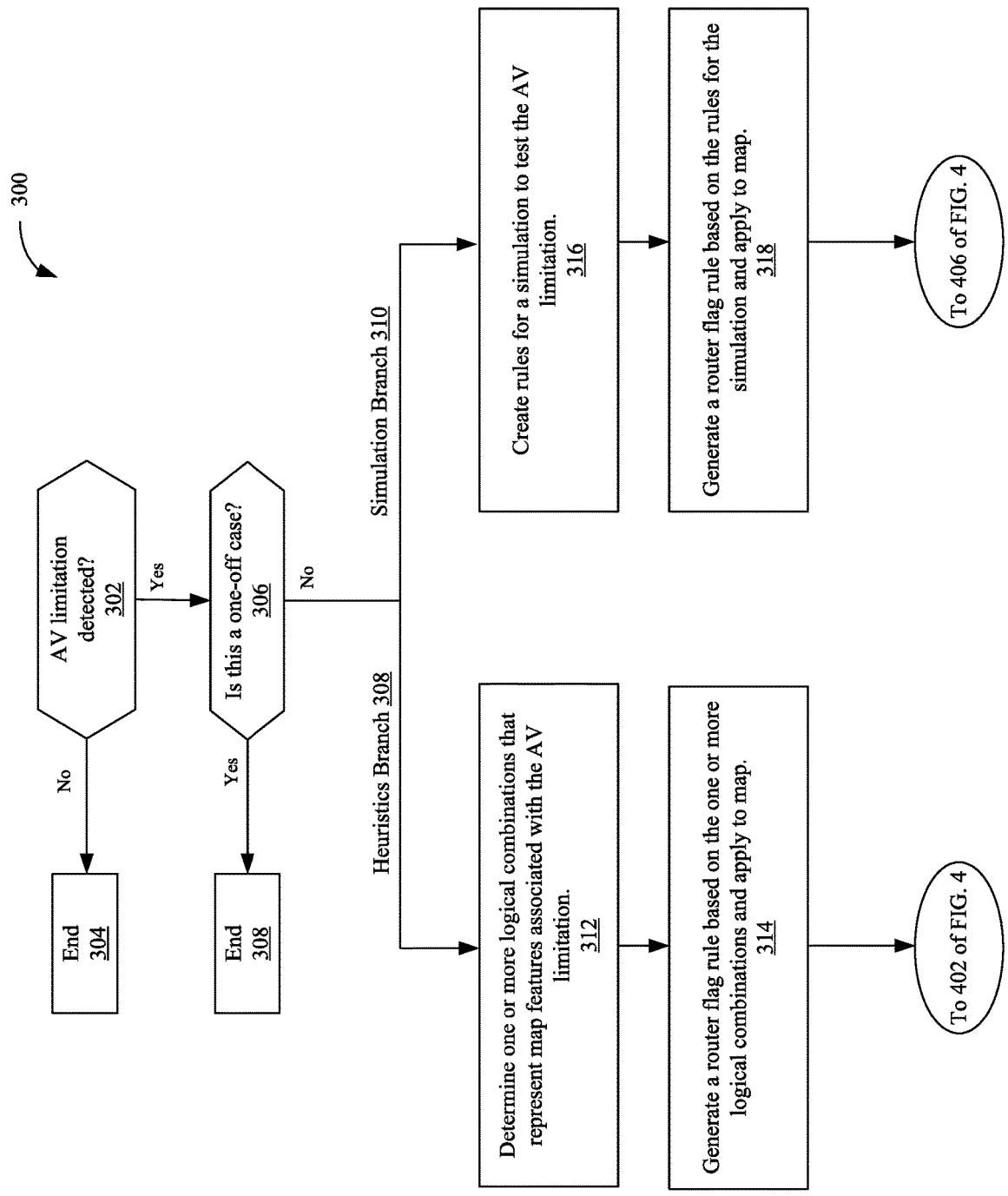
FIG. 3 illustrates a flowchart representation of the creation of router flags, in accordance with some embodiments.

FIG. 3 illustrates a flowchart representation of routing in accordance with capabilities of the autonomous vehicle, in accordance with some embodiments.

Method 300 can begin by determining (302) whether an autonomous vehicle limitation is detected. Limitations, for example, can be detected in any number of ways, such as through diagnostics, simulation, autonomous vehicle failures on the road, etc. In some embodiments, the limitations would be automatically detected. In other embodiments, the limitation can be manually identified. If a limitation is not detected, then method 300 ends (304).

Assuming a limitation was detected, method 300 can then determine (306) if the autonomous vehicle limitation is a systemic issue (i.e., is this a one-off case or is this thematic to the autonomous vehicle?)—if not, and this is a one-off case, then method 300 ends (308). If it is not a one-off case, then the issue is systemic and the method 300 can proceed down or both of the heuristics branch (308) solution or the simulation branch (310) solution. In some embodiments, the heuristics branch (308) can run in parallel with the simulation branch (310).

The heuristics branch (308) can begin by determining (312) one or more logical combinations that represent map features associated with the autonomous vehicle limitation. A router flag rule can then be generated (314) based on the one or more logical combinations and applied to the map. In some embodiments, the router flag rule can be created once and can be applied to identify what parts of the map will cause failures due to an autonomous vehicle limitation each time a new version of the map is created.

In the simulation branch (310), rules for a simulation can be created (316) to test the autonomous vehicle limitation. A router flag rule can then be generated (318) based on the rules for the simulation and applied to the map. Likewise, the router flag rule can be created once and can be applied to identify what parts of the map will cause failures due to an autonomous vehicle limitation each time a new version of the map is created.

Thus, either one or both of the heuristics branch (308) or the simulation branch (310) generates a router flag rule that can be applied to the map—either based on the one or more logical combinations, or the rules for the simulation. In some embodiments, this can be done once per autonomous vehicle limitation that is discovered.

Figure 4:
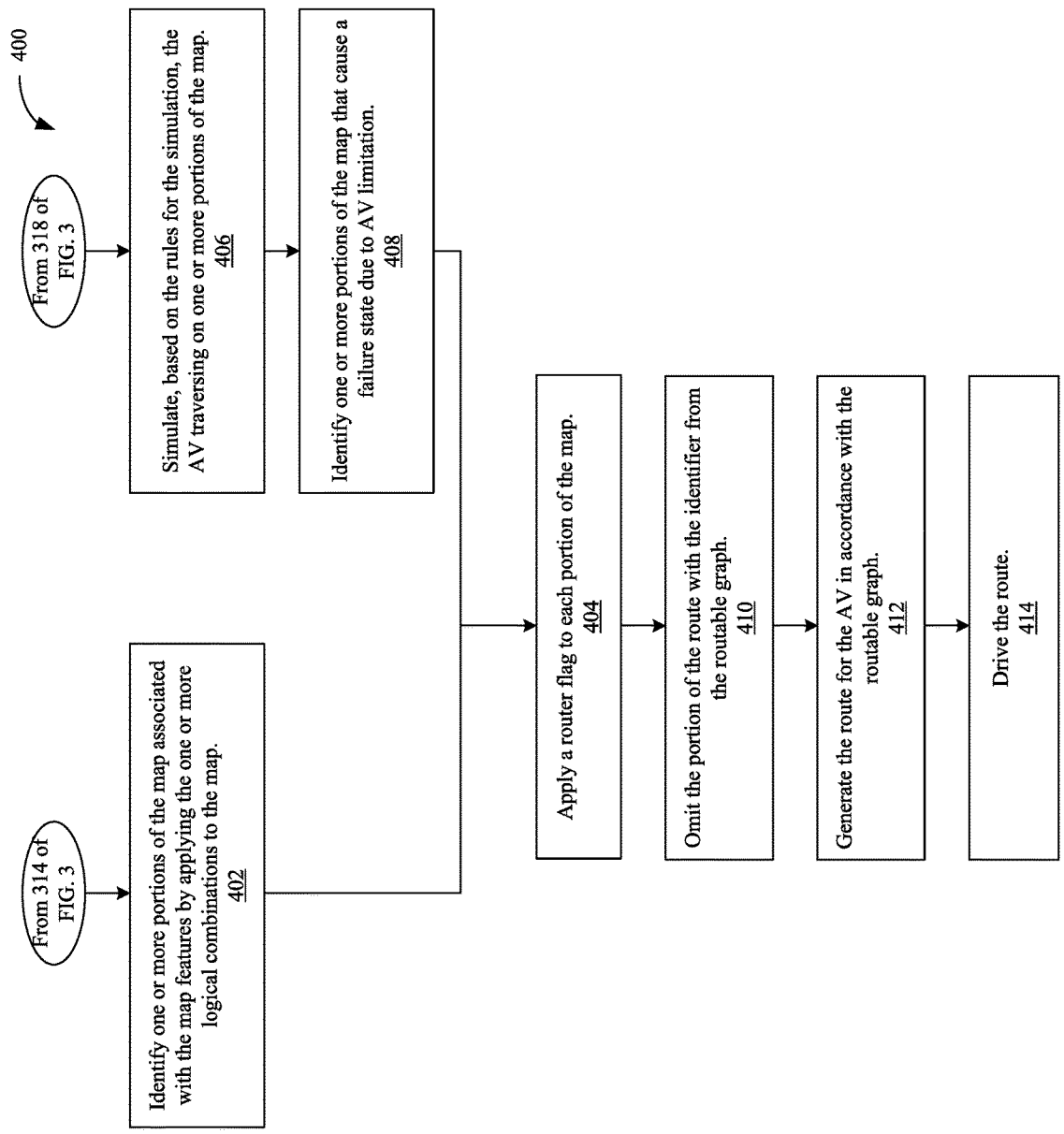
FIG. 4 illustrates a flowchart representation of the creation of a map including the router flags, in accordance with some embodiments.

FIG. 4 illustrates a flowchart representation of applying identifiers, such as router flags, to the map in accordance with some embodiments. In the heuristics branch (308), based on the router flag rule, one or more portions of the map associated with the map features can be identified (402) by applying the one or more logical combinations to the map. The router flag can then be applied (404) to each portion of the map identified by step (402). The router flag can be associated with the autonomous vehicle limitation, which was the root cause of the failure or issue.

In the simulation branch (310), the autonomous vehicle can be simulated (406) traversing on one or more portions of the map based on the rules for the simulation. One or more portions of the map that cause the failure state due to the autonomous vehicle limitation can be identified (408). The router flag can then be applied (404) to each portion of the map identified by step (402), where the router flag can be associated with the autonomous vehicle limitation.

In some embodiments, applying the router flags can be repeated every time a map is created based on the current model of the autonomous vehicle (e.g., most up to date version of the vehicle or software). The router flags are reapplied to the map. While previous map's router flags may not necessarily need to be modified, it is to be understood that router flags based on newly detected autonomous vehicle limitations may be applied to maps already having other router flags.

After the router flag is applied (or reapplied), the portion of the route with the router flag can be omitted (410) from the routable graph. As a result, when the route for the autonomous vehicle is generated (412) in accordance with the routable graph, the places where the router flag has been applied are not considered. Once the route has been generated, then the autonomous vehicle can drive (414) the route.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 5:
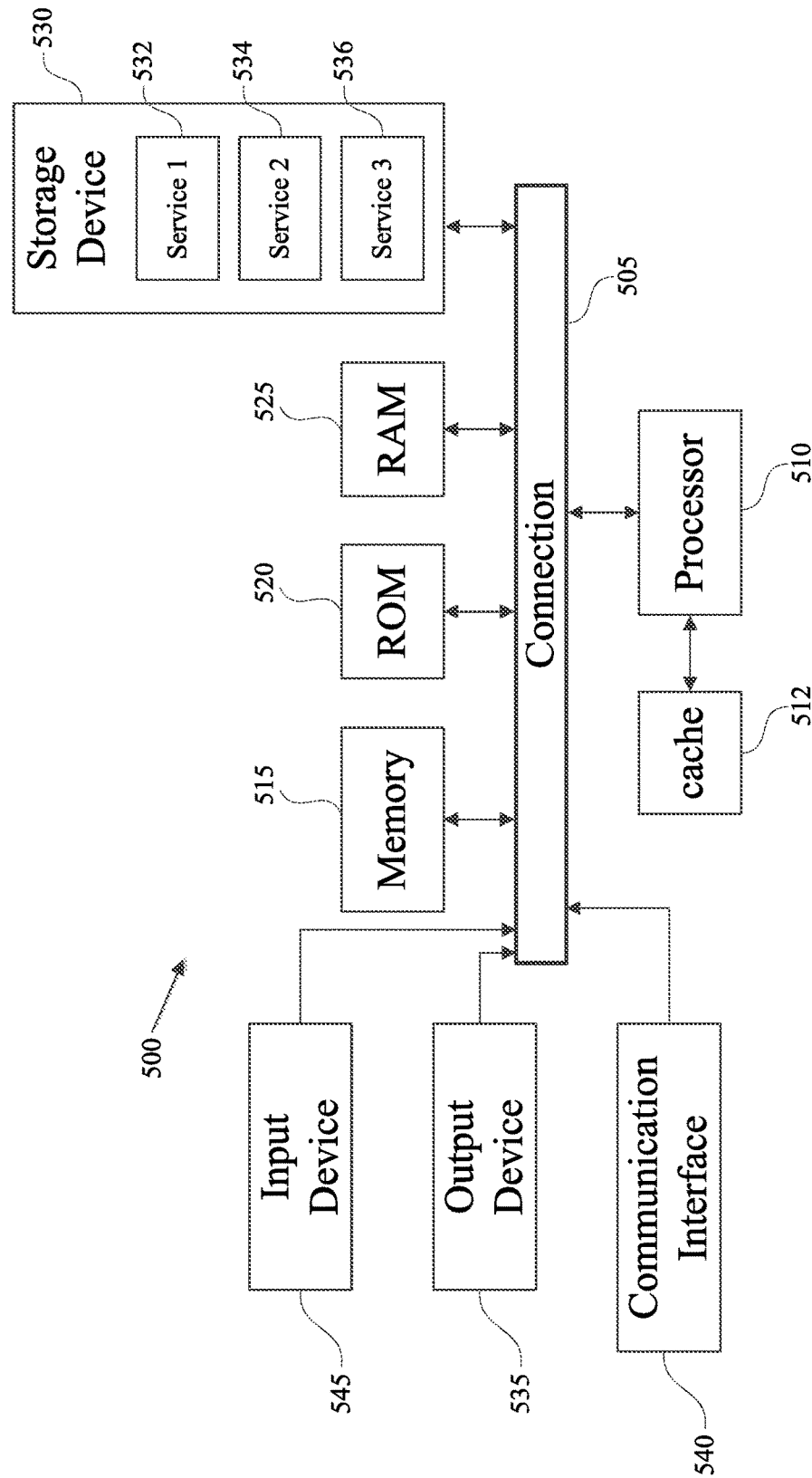
FIG. 5 shows an example of a system for implementing certain aspects of the present technology.

FIG. 5 shows an example of computing system 500, which can be for example any computing device making up internal computing system 110, remote computing system 150, (potential) passenger device executing rideshare app 170, or any component thereof in which the components of the system, such as the components of FIGS. 1 and 2, are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for routing autonomous vehicles comprising:
receiving diagnostic data from a fleet of autonomous vehicles as the fleet of autonomous vehicles navigate in a physical area represented by a map;
modifying a model based on the diagnostic data to generate an updated model;
simulating, based on a set of rules comprising the updated model, one of the fleet of autonomous vehicles traversing at least one route on the map representing the physical area;
generating a router flag at a location on the map when a feature in the simulated route causes a failure of the one of the fleet of autonomous vehicles in the simulation;
creating a router flag rule that defines at least one factor that caused the failure of the one of the fleet of autonomous vehicles associated with the router flag at the location on the map;
simulating the one of the fleet of autonomous vehicles traversing the map based on the router flag rule to identify at least one other area on the map where the one of the fleet of autonomous vehicles is likely to fail;
applying an identifier to the at least one other area on the map where the one of the fleet of autonomous vehicles is likely to fail according to the router flag rule;
omitting the at least one other area with the applied identifier from a routable graph applied to the map;
generating the route for the one of the fleet of autonomous vehicles in accordance with the routable graph;
driving the one of the fleet of autonomous vehicles on the generated route;
confirming an inability of one or more autonomous vehicles within the fleet to operate along the route having the applied identifier; and
based on the inability, determining that the feature associated with the failure is a systemic issue to the one or more autonomous vehicles within the fleet.

2. The method of claim 1, wherein the updated model is based on the diagnostics data received from a specific type of autonomous vehicle within the fleet of autonomous vehicles.

3. The method of claim 1, further comprising applying the identifier each time the map is created based on a current model of the one of the fleet of autonomous vehicles.

4. The method of claim 1, wherein the router flag rule includes one or more logical combinations associated with the failure of the one of the fleet of autonomous vehicles.

5. The method of claim 4, wherein the applying the identifier to the map includes determining if the at least one other area on the map is associated with the one or more logical combinations.

6. The method of claim 1, further comprising:
confirming that the failure applies across one or more autonomous vehicles of a same type within the fleet; and
omitting a portion of the route from the routable graph for each of the one or more autonomous vehicles of the same type, but not for autonomous vehicles of another type that is not prone to the failure.

7. A system comprising:
one or more processors; and
at least one non-transitory computer-readable medium containing instructions which, when executed by the one or more processors, cause the one or more processors to:
receive diagnostic data from a fleet of autonomous vehicles as the fleet of autonomous vehicles navigate in a physical area represented by a map;
modify a model based on the diagnostic data to generate an updated model;
simulate, based on a set of rules comprising the updated model, one of fleet of autonomous vehicles traversing at least one route on a map representing a physical area;
generate a router flag at a location on the map when a feature in the simulated route causes a failure of the one of fleet of autonomous vehicles in the simulation;
create a router flag rule that defines at least one factor that caused the failure of the one of fleet of autonomous vehicles at the location on the map;
simulate the one of fleet of autonomous vehicles traversing the map based on the router flag rule to identify at least one other area on the map where the one of fleet of autonomous vehicles is likely to fail;
apply an identifier to the at least one other area on the map where the one of fleet of autonomous vehicles is likely to fail according to the router flag rule;
omit the at least one other area with the applied identifier from a routable graph applied to the map;
generate the route for the autonomous vehicle in accordance with the routable graph;
instruct the one of fleet of autonomous vehicle to drive on the generated route;
confirm an inability of one or more autonomous vehicles within the fleet to operate along the route having the applied identifier; and
based on the inability, determine that the feature associated with the failure is a systemic issue to the one or more autonomous vehicles within the fleet.

8. The system of claim 7, wherein the updated model is based on diagnostics data received from a specific type of autonomous vehicle within the fleet of autonomous vehicles.

9. The system of claim 7, wherein the at least one non-transitory computer-readable medium contains instructions which, when executed by the one or more processors, cause the one or more processors to apply the identifier every time the map is created based on a current model of the one of fleet of autonomous vehicles.

10. The system of claim 7, wherein the router flag rule includes one or more logical combinations associated with the failure of the one of fleet of autonomous vehicles.

11. The system of claim 10, wherein applying the identifier to the map includes determining if the at least one other area on the map is associated with the one or more logical combinations.

12. The system of claim 7, wherein the at least one non-transitory computer-readable medium contains instructions which, when executed by the one or more processors, cause the one or more processors to:
confirm that the failure applies across one or more autonomous vehicles of a same type within the fleet; and
omit a portion of the route from the routable graph for each of the one or more autonomous vehicles of the same type, but not for autonomous vehicles of another type that is not prone to the failure.

13. A non-transitory computer readable medium comprising instructions, the instructions, when executed by a computing system, cause the computing system to:
receive diagnostic data from a fleet of autonomous vehicles as the fleet of autonomous vehicles navigate in a physical area represented by a map;
modify a model based on the diagnostic data to generate an updated model;
simulate one of fleet of autonomous vehicles traversing at least one route on a map representing a physical area based on a set of rules comprising the updated model;
generate a router flag at a location on the map when a feature in the simulated route causes a failure of the one of fleet of autonomous vehicles in the simulation;
create a router flag rule that defines at least one factor that caused the failure of the one of fleet of autonomous vehicles at the location on the map;
simulate the one of fleet of autonomous vehicles traversing the map based on the router flag rule to identify at least one other area on the map where the one of fleet of autonomous vehicles is likely to fail;
apply an identifier to the at least one other area on the map where the one of fleet of autonomous vehicles is likely to fail according to the router flag rule;
omit the at least one other area with the applied identifier from a routable graph applied to the map;
generate the route for the autonomous vehicle in accordance with the routable graph;
instruct the one of fleet of autonomous vehicle to drive on the generated route;
confirm an inability of one or more autonomous vehicles within the fleet to operate along the route having the applied identifier; and
based on the inability, determine that the feature associated with the failure is a systemic issue to the one or more autonomous vehicles within the fleet.

14. The non-transitory computer readable medium of claim 13, wherein the set of rules comprises a model based on diagnostics data received from a specific type of autonomous vehicle within the fleet of autonomous vehicles.

15. The non-transitory computer readable medium of claim 13, wherein the instructions, when executed by the computing system, cause the computing system to apply the identifier every time the map is created based on a current model of the one of fleet of autonomous vehicles.

16. The non-transitory computer readable medium of claim 13, wherein the router flag rule includes one or more logical combinations associated with the failure of the one of fleet of autonomous vehicles, and wherein the applying the identifier to the map includes determining if the at least one other area on the map is associated with the one or more logical combinations.

17. The non-transitory computer readable medium of claim 13, the instructions further causing the computing system to:
confirm that the failure applies across one or more autonomous vehicles of a same type within the fleet; and
omit a portion of the route from the routable graph for each of the one or more autonomous vehicles of the same type, but not for autonomous vehicles of another type that is not prone to the failure.

* * * * *